US012803463B2

(12) United States Patent
Ikeda et al.

(10) Patent No.: US 12,803,463 B2
(45) Date of Patent: Nov. 17, 2026

(54) SINGLE-PHASE THREE-WIRE INVERTER AND CONTROL METHOD

(71) Applicant: SHINDENGEN ELECTRIC MANUFACTURING CO., LTD., Tokyo (JP)

(72) Inventors: Masataka Ikeda, Saitama (JP); Yusuke Minami, Saitama (JP)

(73) Assignee: SHINDENGEN ELECTRIC MANUFACTURING CO., LTD., Tokyo (JP)

( * ) Notice: Subject to any disclaimer, the term of this patent is extended or adjusted under 35 U.S.C. 154(b) by 111 days.

(21) Appl. No.: 19/038,725

(22) Filed: Jan. 28, 2025

(65) Prior Publication Data

US 2025/0247015 A1 Jul. 31, 2025

(30) Foreign Application Priority Data

Jan. 29, 2024 (JP) ................................ 2024-011282

(51) Int. Cl.
*H02M 7/483* (2007.01)
*H02M 1/32* (2007.01)
*H02M 7/537* (2006.01)

(52) U.S. Cl.
CPC ............ *H02M 7/483* (2013.01); *H02M 1/32* (2013.01); *H02M 7/537* (2013.01)

(58) Field of Classification Search
CPC ........ H02M 7/483; H02M 1/32; H02M 7/537; H02M 1/0009; H02M 1/38; H02M 7/5387
See application file for complete search history.

(56) References Cited

U.S. PATENT DOCUMENTS 9,800,168 B2 * 10/2017 Zou ...................... H02M 5/458

FOREIGN PATENT DOCUMENTS

JP 2015-002657 A 1/2015

* cited by examiner

*Primary Examiner* — Kyle J Moody
(74) *Attorney, Agent, or Firm* — XSENSUS LLP

(57) ABSTRACT

A first arm outputting first phase voltage and first phase current, a second arm outputting second phase voltage and second phase current, a third arm outputting third phase voltage and third phase current, a filter, and a control unit outputting first to third switching signals, to the first to third arms, are included. The control unit reduces a duty cycle of the first switching signal when an absolute value of the first phase current is equal to or larger than a first threshold current, reduces a duty cycle of the second switching signal when an absolute value of the second phase current is equal to or larger than the first threshold current, and reduces a duty cycle of the third switching signal when an absolute value of the third phase current is equal to or larger than a second threshold current larger than the first threshold current.

5 Claims, 11 Drawing Sheets

SINGLE-PHASE THREE-WIRE INVERTER AND CONTROL METHOD

CROSS-REFERENCE TO RELATED APPLICATION(S)

The present application claims priority to and incorporates by reference the entire contents of Japanese Patent Application No. 2024-011282 filed in Japan on Jan. 29, 2024.

BACKGROUND OF THE INVENTION

1. Field of the Invention

The present disclosure relates to a single-phase three-wire inverter and a control method.

2. Description of the Related Art

A single-phase three-wire inverter device described in JP 2015-2657 A lowers, when a surge current is detected in the A phase, A-phase AC voltage to reduce A-phase current, and on the other hand, and meanwhile, lowers a B-phase conduction ratio to suppress overvoltage in the B-phase that may be induced by the surge current in the A-phase.

In the single-phase inverter, an overcurrent protection circuit is provided on the upstream of each of gate drive circuits of U-phase and V-phase. The overcurrent protection circuit compares a current detection signal with a current threshold, performs an AND operation on a comparison result signal and a PWM signal, outputs an AND result signal to the gate drive circuit, thereby reducing the on-duty of a gate drive signal.

In the single-phase three-wire inverter, when the overcurrent protection circuit is provided on the upstream of each of the gate drive circuits for the U-phase, V-phase, and N-phase, a waveform similar to a waveform of the single-phase inverter can be obtained, when a load (overcurrent load) against which overcurrent protection works between the U-phase and the V-phase is connected.

However, when a first load that is an overcurrent load is connected between a first phase (e.g., U-phase) and a third phase (e.g., N-phase), a difference occurs between voltage between the first phase and the third phase and voltage between the third phase and a second phase (e.g., V-phase). In other words, the voltage between the first phase and the third phase decreases, and the voltage between the third phase and the second phase increases. Therefore, voltage higher than withstand voltage may be applied to a second load connected between the third phase and the second phase. Therefore, the single-phase three-wire inverter requires an overcurrent protection configuration different from the single-phase inverter described above.

SUMMARY OF THE INVENTION

It is an object of the present invention to at least partially solve the problems in the conventional technology.

The above and other objects, features, advantages and technical and industrial significance of this invention will be better understood by reading the following detailed description of presently preferred embodiments of the invention, when considered in connection with the accompanying drawings.

A single-phase three-wire inverter according to the present disclosure comprising: a first arm that is connected between a first input terminal and a second input terminal to output first phase voltage and first phase current from a first connection point between a first switching element and a second switching element; a second arm that is connected between the first input terminal and the second input terminal to output second phase voltage and second phase current from a second connection point between a third switching element and a fourth switching element; a third arm that is connected between the first input terminal and the second input terminal to output third phase voltage and third phase current from a third connection point between a fifth switching element and a sixth switching element; a filter that is provided between the first connection point and a first output terminal, between the second connection point and a second output terminal, and between the third connection point and a third output terminal; and a control unit that outputs a first switching signal, a second switching signal, and a third switching signal, to the first arm to the third arm, respectively, wherein the control unit reduces a duty cycle of the first switching signal when an absolute value of the first phase current is equal to or larger than a first threshold current, reduces a duty cycle of the second switching signal when an absolute value of the second phase current is equal to or larger than the first threshold current, and reduces a duty cycle of the third switching signal when an absolute value of the third phase current is equal to or larger than a second threshold current larger than the first threshold current.

A control method according to the present disclosure the control method of controlling a single-phase three-wire inverter, the single-phase three-wire inverter including a first arm that is connected between a first input terminal and a second input terminal to output first phase voltage and first phase current from a first connection point between a first switching element and a second switching element, a second arm that is connected between the first input terminal and the second input terminal to output second phase voltage and second phase current from a second connection point between a third switching element and a fourth switching element, a third arm that is connected between the first input terminal and the second input terminal to output third phase voltage and third phase current from a third connection point between a fifth switching element and a sixth switching element, and a filter that is provided between the first connection point and a first output terminal, between the second connection point and a second output terminal, and between the third connection point and a third output terminal, the method comprising reducing a duty cycle of a first switching signal for the first arm when an absolute value of the first phase current is equal to or larger than a first threshold current, reducing a duty cycle of a second switching signal for the second arm when an absolute value of the second phase current is equal to or larger than the first threshold current, and reducing a duty cycle of a third switching signal for the third arm when an absolute value of the third phase current is equal to or larger than a second threshold current larger than the first threshold current.

DETAILED DESCRIPTION OF THE PREFERRED EMBODIMENTS

Figure 1:
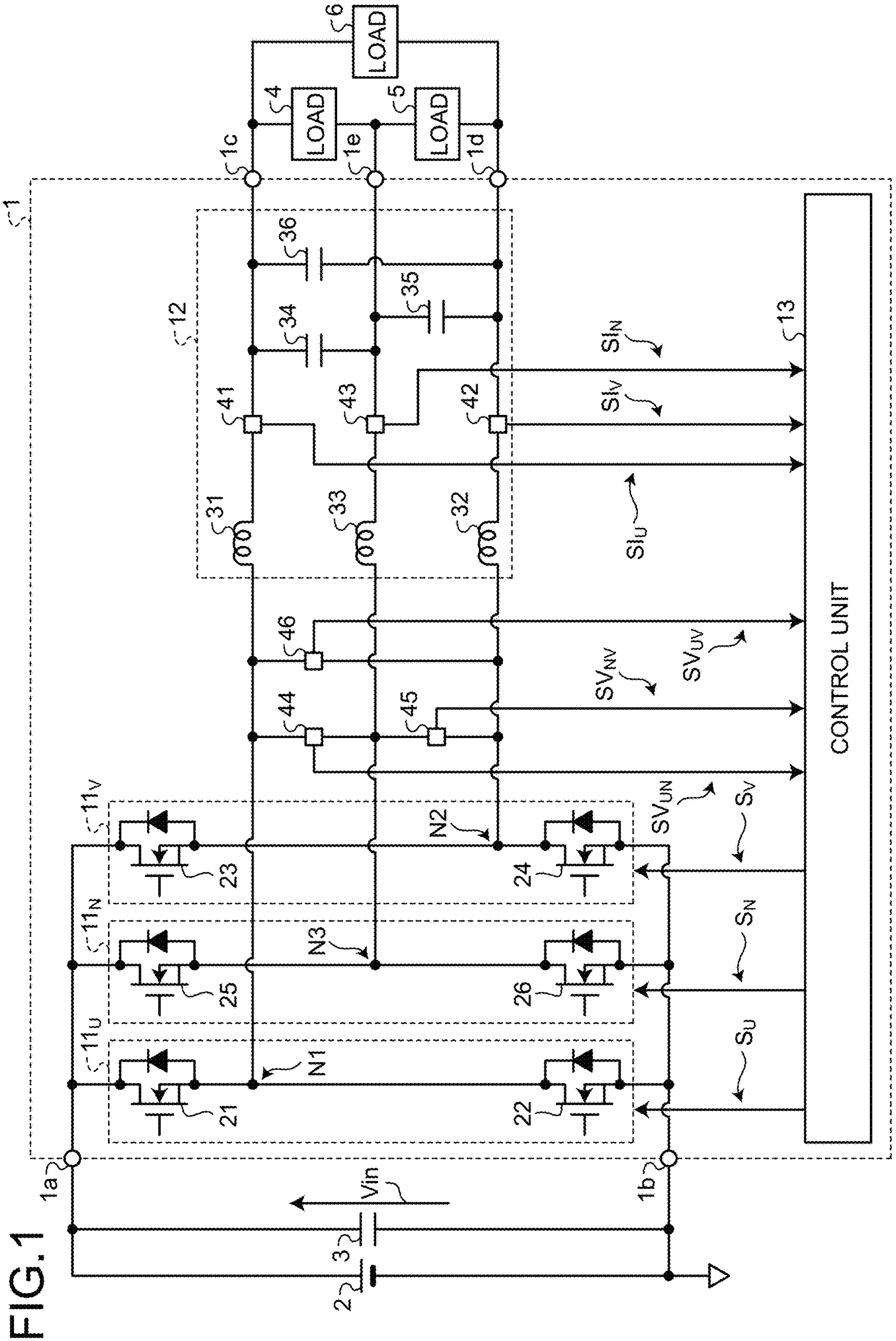
FIG. 1 is a diagram illustrating the overall configuration of a single-phase three-wire inverter according to an embodiment.

Hereinafter, embodiments according to the present disclosure will be described in detail with reference to the accompanying drawings. Note that the present disclosure is not limited to the embodiments, and in the following embodiments, the same portions are denoted by the same reference numerals, and the description thereof will not be repeated.

Embodiments

Overall Configuration

FIG. 1 is a diagram illustrating the overall configuration of a single-phase three-wire inverter according to an embodiment. In the single-phase three-wire inverter 1, DC input voltage Vin output from a power supply 2 and smoothed by a smoothing capacitor 3 is input between a first input terminal 1*a* and a second input terminal 1*b*. The single-phase three-wire inverter 1 outputs U-phase to N-phase voltage $V_{UN}$ to a load 4 from between a first output terminal 1*c* and a third output terminal 1*e*. The single-phase three-wire inverter 1 outputs N-phase to V-phase voltage $V_{NV}$ to a load 5 from between the third output terminal 1*e* and a second output terminal 1*d*. The single-phase three-wire inverter 1 outputs U-phase to V-phase voltage $V_{UV}$ to a load 6 from between the first output terminal 1*c* and the second output terminal 1*d*.

The single-phase three-wire inverter 1 includes a U-phase arm $\mathbf{11}_U$, a V-phase arm $\mathbf{11}_V$, an N-phase arm $\mathbf{11}_N$, a filter 12, a control unit 13, current detectors 41 to 43, and voltage detectors 44 to 46.

The U-phase arm $\mathbf{11}_U$ corresponds to an example of a “first arm” according to the present disclosure. The V-phase arm $\mathbf{11}_V$ corresponds to an example of a “second arm” according to the present disclosure. The N-phase arm $\mathbf{11}_N$ corresponds to an example of a “third arm” according to the present disclosure.

The U-phase arm $\mathbf{11}_U$ includes a first transistor 21 and a second transistor 22. The V-phase arm $\mathbf{11}_V$ includes a third transistor 23 and a fourth transistor 24. The N-phase arm $\mathbf{11}_N$ includes a fifth transistor 25 and a sixth transistor 26.

In the embodiment, each of the transistors is MOSFET, but the present disclosure is not limited thereto. Each transistor may be a silicon power device, a GaN power device, a SiC power device (e.g., insulated gate bipolar transistor (IGBT)), or the like.

Each transistor has a parasitic diode (body diode) that can aggressively apply current, or a diode that is connected antiparallel. The parasitic diode is a p-n junction between a back gate and a source and a drain of the MOSFET.

The first transistor 21 corresponds to an example of a “first switching element” according to the present disclosure. The second transistor 22 corresponds to an example of a “second switching element” according to the present disclosure. The third transistor 23 corresponds to an example of a “third switching element” according to the present disclosure. The fourth transistor 24 corresponds to an example of a “fourth switching element” v the present disclosure. The fifth transistor 25 corresponds to an example of a “fifth switching element” according to the present disclosure. The sixth transistor 26 corresponds to an example of a “sixth switching element” according to the present disclosure.

The first transistor 21 has a drain that is electrically connected to the first input terminal 1*a*. The first transistor 21 has a source that is electrically connected to a first node N1. The second transistor 22 has a drain that is electrically connected to the first node N1. The second transistor 22 has a source that is electrically connected to the second input terminal 1*b*.

The first node N1 corresponds to an example of a “first connection point” according to the present disclosure.

When the first transistor 21 is on and the second transistor 22 is off, the U-phase arm $\mathbf{11}_U$ outputs a high-level voltage (DC input voltage Vin) from the first node N1. When the first transistor 21 is off and the second transistor 22 is on, the U-phase arm $\mathbf{11}_U$ outputs a low-level voltage (0 V) from the first node N1.

The third transistor 23 has a drain that is electrically connected to the first input terminal 1*a*. The third transistor 23 has a source that is electrically connected to a second node N2. The fourth transistor 24 has a drain that is electrically connected to the second node N2. The fourth transistor 24 has a source that is electrically connected to the second input terminal 1*b*.

The second node N2 corresponds to an example of a “second connection point” according to the present disclosure.

When the third transistor 23 is on and the fourth transistor 24 is off, the V-phase arm $\mathbf{11}_V$ outputs a high-level voltage (DC input voltage Vin) from the second node N2. When the third transistor 23 is off and the fourth transistor 24 is on, the V-phase arm $\mathbf{11}_V$ outputs a low-level voltage (0 V) from the second node N2.

The fifth transistor 25 has a drain that is electrically connected to the first input terminal 1*a*. The fifth transistor 25 has a source that is electrically connected to a third node N3. The sixth transistor 26 has a drain that is electrically connected to the third node N3. The sixth transistor 26 has a source that is electrically connected to the second input terminal 1*b*.

The third node N3 corresponds to an example of a “third connection point” according to the present disclosure.

When the fifth transistor 25 is on and the sixth transistor 26 is off, the N-phase arm $\mathbf{11}_N$ outputs a high-level voltage (DC input voltage Vin) from the third node N3. When the fifth transistor 25 is off and the sixth transistor 26 is on, the N-phase arm $\mathbf{11}_N$ outputs a low-level voltage (0 V) from the third node N3.

The filter 12 includes inductors 31 to 33 and capacitors 34 to 36.

The inductor 31 has one end that is electrically connected to the first node N1. The inductor 31 has the other end that is electrically connected to the first output terminal 1*c*. The inductor 32 has one end that is electrically connected to the second node N2. The inductor 32 has the other end that is electrically connected to the second output terminal 1*d*. The inductor 33 has one end that is electrically connected to the third node N3. The inductor 33 has the other end that is electrically connected to the third output terminal 1*e*.

The capacitor 34 has one end that is electrically connected to the other end of the inductor 31. The capacitor 34 has the other end that is electrically connected to the other end of the inductor 33. The capacitor 35 has one end that is electrically connected to the other end of the inductor 32. The capacitor 35 has the other end that is electrically connected to the other end of the inductor 33. The capacitor 36 has one end that is electrically connected to the other end of the inductor 31. The capacitor 36 has the other end that is electrically connected to the other end of the inductor 32.

The current detector 41 is electrically connected between the other end of the inductor 31 and the one end of the capacitor 34. The current detector 41 detects U-phase current $I_U$ and outputs a signal $SI_U$ representing the U-phase current $I_U$, to the control unit 13.

The U-phase current $I_U$ corresponds to an example of "first phase current" according to the present disclosure.

The current detector 42 is electrically connected between the other end of the inductor 32 and the other end of the capacitor 35. The current detector 42 detects V-phase current $I_V$ and outputs a signal $SI_V$ representing the V-phase current $I_V$, to the control unit 13.

The V-phase current $I_V$ corresponds to an example of "second phase current" according to the present disclosure.

The current detector 43 is electrically connected between the other end of the inductor 33 and the other end of the capacitor 34. The current detector 43 detects N-phase current $I_N$ and outputs a signal $SI_N$ representing the N-phase current $I_N$, to the control unit 13.

The N-phase current $I_N$ corresponds to an example of "third phase current" according to the present disclosure.

The voltage detector 44 is electrically connected between the first node N1 and the third node N3. The voltage detector 44 detects the U-phase to N-phase voltage $V_{UN}$ and outputs a signal $SV_{UN}$ representing the U-phase to N-phase voltage $V_{UN}$, to the control unit 13.

The voltage detector 45 is electrically connected between the second node N2 and the third node N3. The voltage detector 45 detects the N-phase to V-phase voltage $V_{NV}$ and outputs a signal $SV_{NV}$ representing the N-phase to V-phase voltage $V_{NV}$, to the control unit 13.

The voltage detector 46 is electrically connected between the first node N1 and the second node N2. The voltage detector 46 detects the U-phase to V-phase voltage $V_{UV}$ and outputs a signal $S_{UV}$ representing the U-phase to V-phase voltage $V_{UV}$, to the control unit 13.

The control unit 13 outputs a switching control signal $S_U$ to the U-phase arm $\mathbf{11}_U$, outputs a switching control signal $S_V$ to the V-phase arm $\mathbf{11}_V$, and outputs a switching control signal $S_N$ to the N-phase arm $\mathbf{11}_N$, on the basis of the signal $SI_U$, the signal $SI_V$, the signal $SI_N$, the signal $SV_{UN}$, the signal $SV_{NV}$, and the signal $SV_{UV}$.

Control Unit of First Comparative Example

Figure 2:
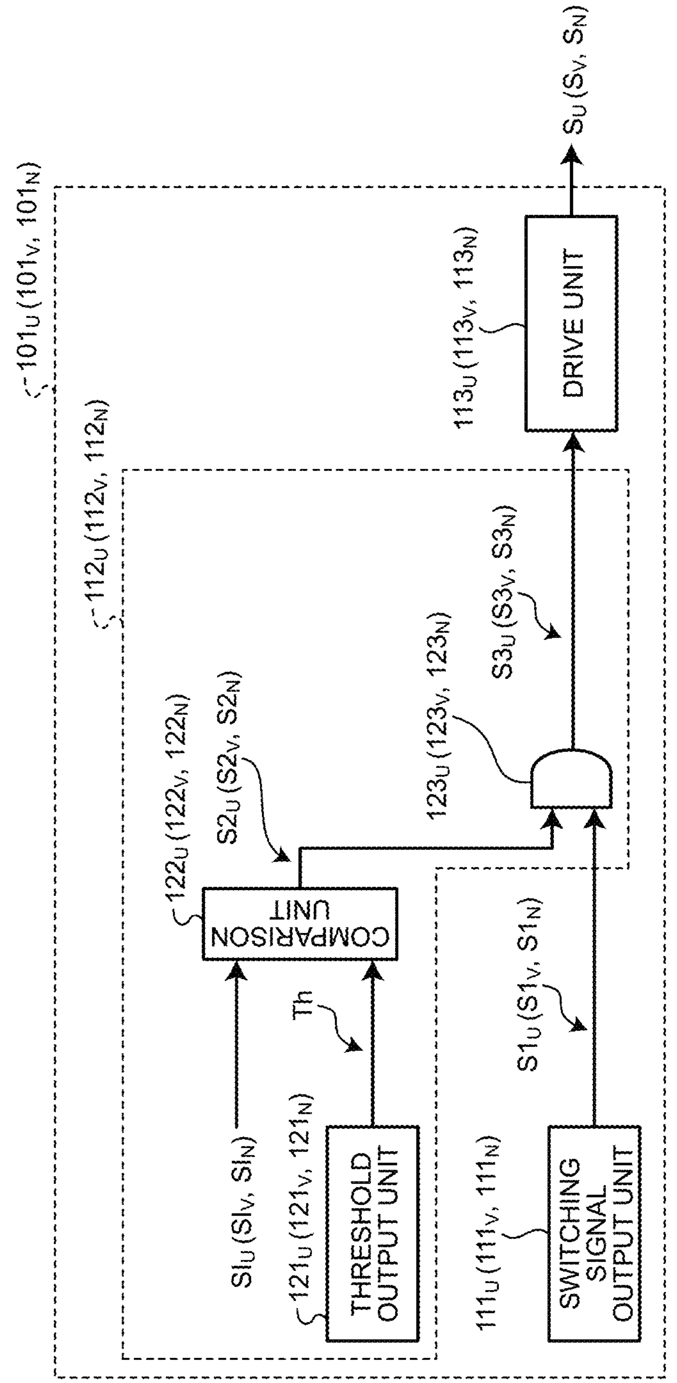
FIG. 2 is a diagram illustrating a configuration of a control unit for each phase according to a first comparative example.

FIG. 2 is a diagram illustrating a configuration of a control unit for each phase according to a first comparative example. In FIG. 2, a U-phase control unit $\mathbf{101}_U$ will be mainly described. The configurations of a V-phase control unit $\mathbf{101}_V$ and an N-phase control unit $\mathbf{101}_N$ are similar to the configuration of the U-phase control unit $\mathbf{101}_U$, and therefore, individual configurations thereof will not be described.

The U-phase control unit $\mathbf{101}_U$ includes a switching signal output unit $\mathbf{111}_U$, an overcurrent protection unit $\mathbf{112}_U$, and a drive unit $\mathbf{113}_U$. The overcurrent protection unit $\mathbf{112}_U$ includes a threshold output unit $\mathbf{121}_U$, a comparison unit $\mathbf{122}_U$, and an AND circuit $\mathbf{123}_U$.

The switching signal output unit $\mathbf{111}_U$ outputs a pulse width modulation signal (PWM signal) $S\mathbf{1}_U$ to one input terminal of the AND circuit $\mathbf{123}_U$. For example, the switching signal output unit $\mathbf{111}_U$ outputs the pulse width modulation signal $S\mathbf{1}_U$ so that the U-phase to N-phase voltage $V_{UN}$ has the command value voltage.

The threshold output unit $\mathbf{121}_U$ outputs a phase current threshold Th to one input terminal of the comparison unit $\mathbf{122}_U$.

In the first comparative example, the phase current threshold Th has the same value for the U-phase, the V-phase, and the N-phase.

The signal $SI_U$ indicating the U-phase current $I_U$ is input to the other input terminal of the comparison unit $\mathbf{122}_U$. The comparison unit $\mathbf{122}_U$ compares an absolute value of the U-phase current $I_U$ with the phase current threshold Th. When the absolute value of the U-phase current $I_U$ is less than the phase current threshold Th, the comparison unit $\mathbf{122}_U$ outputs a high-level comparison result signal $S\mathbf{2}_U$, to the other input terminal of the AND circuit $\mathbf{123}_U$. When the absolute value of the U-phase current $I_U$ is equal to or larger than the phase current threshold Th, the comparison unit $\mathbf{122}_U$ outputs a low-level comparison result signal $S\mathbf{2}_U$ to the other input terminal of the AND circuit $\mathbf{123}_U$.

The AND circuit $\mathbf{123}_U$ performs an AND operation on the pulse width modulation signal $S\mathbf{1}_U$ and the comparison result signal $S\mathbf{2}_U$, and outputs an AND result signal $S\mathbf{3}_U$ to the drive unit $\mathbf{113}_U$.

The drive unit $\mathbf{113}_U$ converts a voltage level of the AND result signal $S\mathbf{3}_U$ and outputs the switching control signal $S_U$ to the U-phase arm $\mathbf{11}_U$.

In other words, when the absolute value of the U-phase current $I_U$ is equal to or larger than the phase current threshold Th, the U-phase control unit $\mathbf{101}_U$ reduces the on-duty (a duty cycle representing a ratio of turning on of the first transistor 21) of the switching control signal $S_U$.

Similarly, when an absolute value of the V-phase current $I_V$ is equal to or larger than the phase current threshold Th, the V-phase control unit $\mathbf{101}_V$ reduces the on-duty (a duty cycle representing a ratio of turning on of the third transistor 23) of the switching control signal $S_V$.

Similarly, when an absolute value of the N-phase current $I_N$ is equal to or larger than the phase current threshold Th, the N-phase control unit $\mathbf{101}_N$ reduces the on-duty (a duty cycle representing a ratio of turning on of the fifth transistor 25) of the switching control signal $S_N$.

Measurement Results in First Comparative Example

Figure 3:
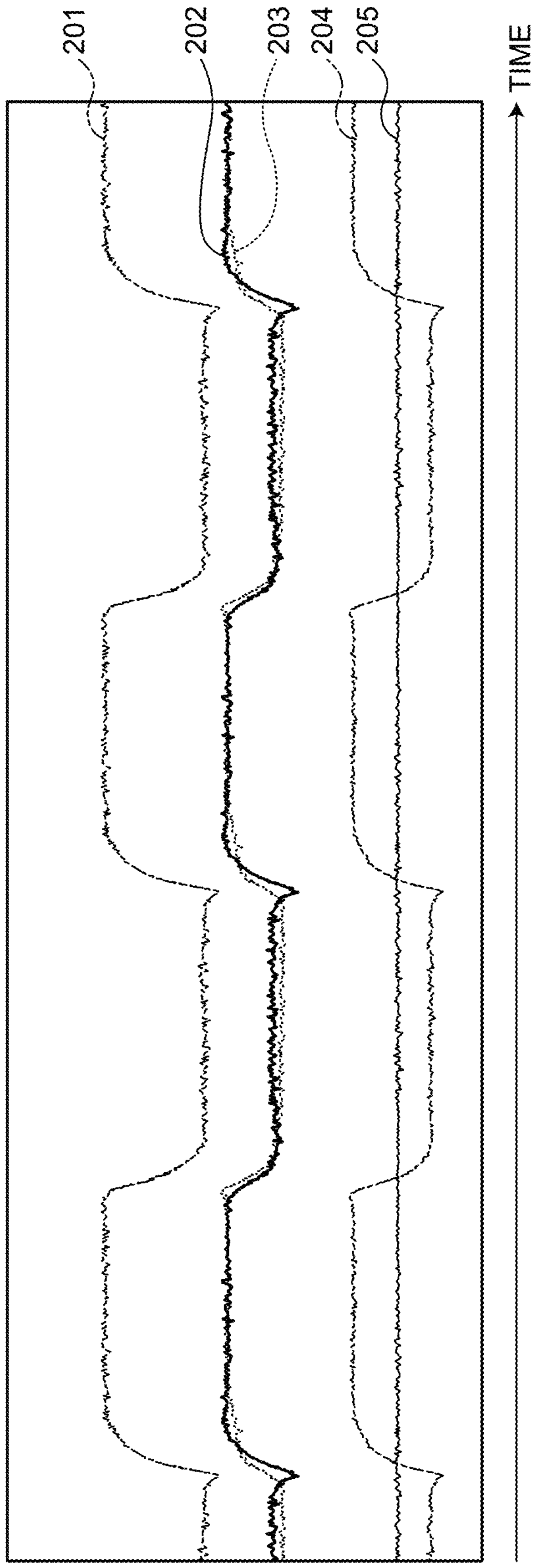
FIG. 3 is a graph illustrating measurement results in the first comparative example.

FIG. 3 is a graph illustrating measurement results in the first comparative example. Specifically, FIG. 3 is a diagram illustrating measurement results in the single-phase three-wire inverter according to the first comparative example when an overcurrent flows through the load 6 electrically connected between the U-phase and the V-phase.

In FIG. 3, a line 201 represents the U-phase to V-phase voltage $V_{UV}$, a line 202 represents the U-phase to N-phase voltage $V_{UN}$, and a line 203 represents the N-phase to V-phase voltage $V_{NV}$. A line 204 represents the U-phase current $I_U$, and a line 205 represents the N-phase current $I_N$.

This example shows that due to the overcurrent through the load 6, the U-phase to V-phase voltage $V_{UV}$ (line 201) is limited as illustrated in FIG. 3. Furthermore, the U-phase to N-phase voltage $V_{UN}$ (line 202) and the N-phase to V-phase voltage $V_{NV}$ (line 203) are also limited. Note the U-phase to N-phase voltage $V_{UN}$ (line 202) and the N-phase to V-phase voltage $V_{NV}$ (line 203) have the same voltage.

Figure 4:
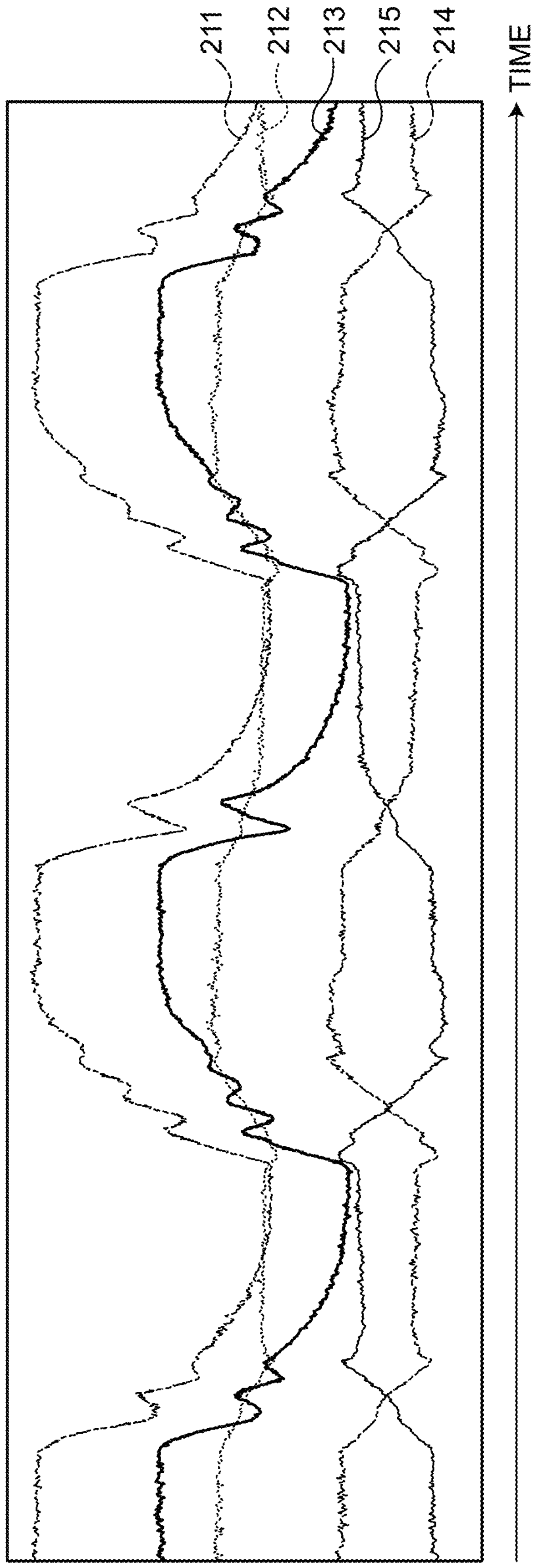
FIG. 4 is a graph illustrating measurement results in the first comparative example.

FIG. 4 is a graph illustrating measurement results in the first comparative example. Specifically, FIG. 4 is a graph illustrating measurement results in the single-phase three-wire inverter in the first comparative example, when an overcurrent flows through the load 4 electrically connected between the U-phase and the N-phase.

In FIG. 4, a line 211 represents the U-phase to V-phase voltage $V_{UV}$, a line 212 represents the U-phase to N-phase voltage $V_{UN}$, and a line 213 represents the N-phase to V-phase voltage $V_{NV}$. A line 214 represents the U-phase current $I_U$, and a line 215 represents the N-phase current $I_N$.

Problem of First Comparative Example

This example shows that due to the overcurrent through the load 4, the U-phase to N-phase voltage $V_{UN}$ (line 212) is limited as illustrated in FIG. 4. Furthermore, the N-phase to V-phase voltage $V_{NV}$ (line 213) and the U-phase to V-phase voltage $V_{UV}$ (line 211) are also limited. However, the N-phase to V-phase voltage $V_{NV}$ (line 213) is higher than the U-phase to N-phase voltage $V_{UN}$ (line 212), and the waveform is disturbed.

It is considered that this is because the U-phase arm $\mathbf{11}_U$ and the V-phase arm $\mathbf{11}_V$ are connected in parallel to one DC input voltage Vin, and when an overcurrent flowing through the load 4 causes operation of an overcurrent protection unit $\mathbf{112}_N$, the duty cycle of switching control signal $S_N$ for the N-phase is made imbalanced. Therefore, it is considered that, as a result of the imbalanced duty cycle of the switching control signal $S_N$ for the N-phase, the N-phase to V-phase voltage $V_{NV}$ is raised.

Control Unit of Second Comparative Example

In a second comparative example, the U-phase control unit $\mathbf{101}_U$ and the V-phase control unit $\mathbf{101}_V$ are the same as the U-phase control unit $\mathbf{101}_U$ and the V-phase control unit $\mathbf{101}_V$ of the first embodiment. However, the N-phase control unit $\mathbf{101}_N$ of the second comparative example does not include the overcurrent protection unit $\mathbf{112}_N$. In other words, the N-phase control unit $\mathbf{101}_N$ of the second comparative example does not reduce the on-duty of the switching control signal $S_N$.

Measurement Results in Second Comparative Example

Figure 5:
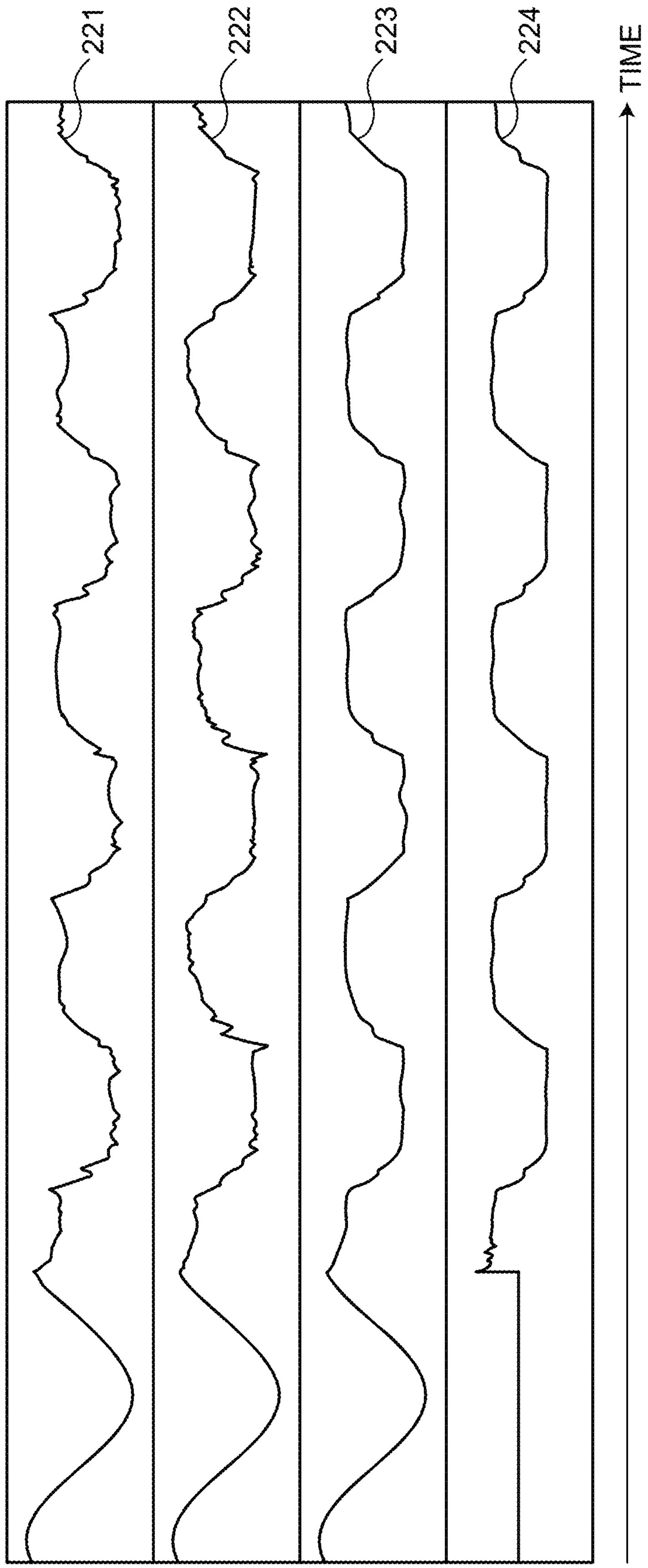
FIG. 5 is a graph illustrating measurement results in a second comparative example.

FIG. 5 is a graph illustrating measurement results in the second comparative example. Specifically, FIG. 5 is a diagram illustrating measurement results in the single-phase three-wire inverter according to the second comparative example when an overcurrent flows through the load 6 electrically connected between the U-phase and the V-phase.

In FIG. 5, a line 221 represents the U-phase to N-phase voltage $V_{UN}$, a line 222 represents the N-phase to V-phase voltage $V_{NV}$, and a line 223 represents the U-phase to V-phase voltage $V_{UV}$. A line 224 represents the U-phase current $I_U$.

This example shows that due to the overcurrent through the load 6, the U-phase to V-phase voltage $V_{UV}$ (line 223) is limited as illustrated in FIG. 5. Furthermore, the U-phase to N-phase voltage $V_{UN}$ (line 221) and the N-phase to V-phase voltage $V_{NV}$ (line 222) are also limited.

Figure 6:
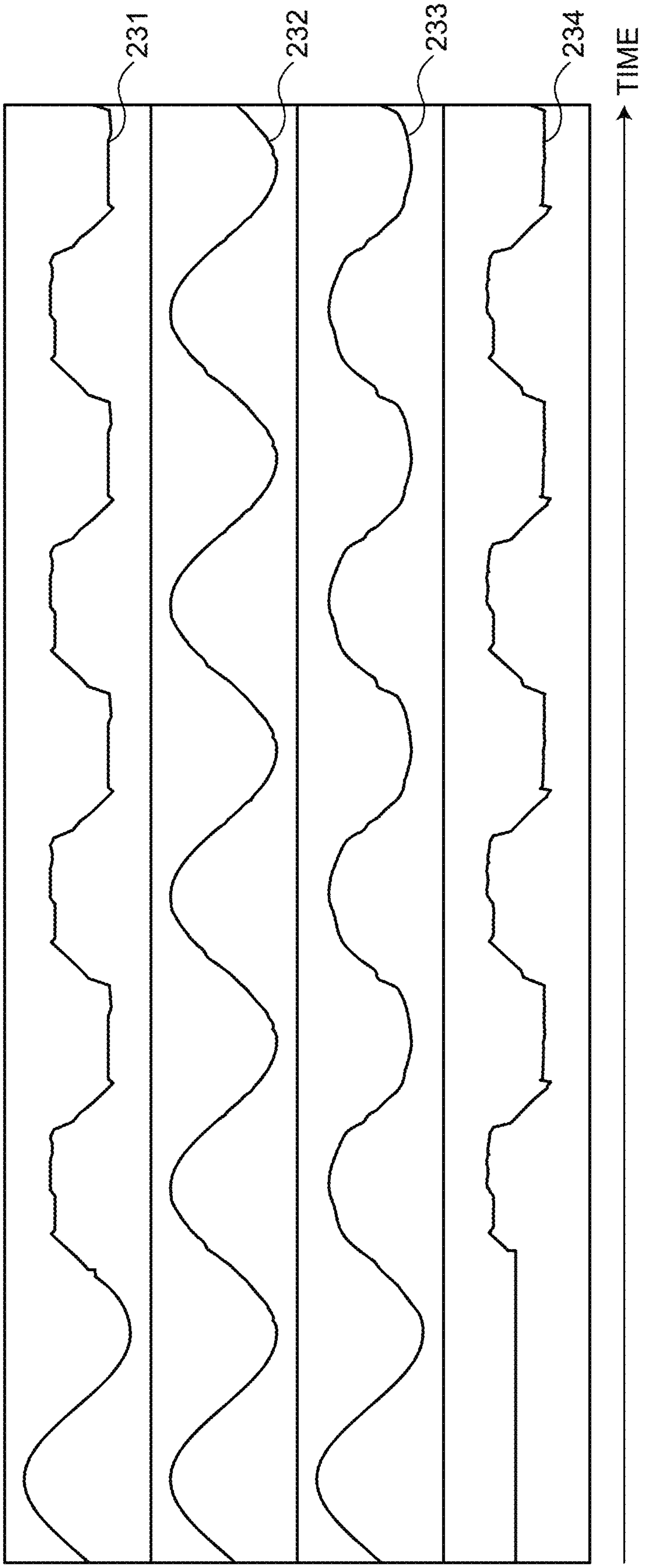
FIG. 6 is a graph illustrating measurement results in the second comparative example.

FIG. 6 is a graph illustrating measurement results in the second comparative example. Specifically, FIG. 6 is a graph illustrating measurement results of the single-phase three-wire inverter in the second comparative example, with an overcurrent flowing through the load 4 between the U-phase and the N-phase.

In FIG. 6, a line 231 represents the U-phase to N-phase voltage $V_{UN}$, a line 232 represents the N-phase to V-phase voltage $V_{NV}$, and a line 233 represents the U-phase to V-phase voltage $V_{UV}$. A line 234 represents the U-phase current $I_U$.

This example shows that due to the overcurrent through the load 4, the U-phase to N-phase voltage $V_{UN}$ (line 231) is limited as illustrated in FIG. 6. However, in the second comparative example, the N-phase control unit $\mathbf{101}_N$ does not include the overcurrent protection unit $\mathbf{112}_N$ and does not reduce the on-duty of the switching control signal $S_N$. Therefore, the N-phase to V-phase voltage $V_{NV}$ (line 232) and the U-phase to V-phase voltage $V_{UV}$ (line 233) are not limited. The N-phase to V-phase voltage $V_{NV}$ (line 232) and the U-phase to V-phase voltage $V_{UV}$ (line 233) are not limited, and preferably have sinusoidal waveforms without waveform disturbance.

Problem of Second Comparative Example

In the second comparative example, the N-phase control unit $\mathbf{101}_N$ does not include the overcurrent protection unit $\mathbf{112}_N$, and therefore, the N-phase current $I_N$ is not limited. Therefore, there is a possibility that a large current may flow through the fifth transistor 25 and the sixth transistor 26 of the N-phase arm $\mathbf{11}_N$. In order to suppress damage of the fifth transistor 25 and the sixth transistor 26, the N-phase control unit $\mathbf{101}_N$ desirably includes the overcurrent protection unit $\mathbf{112}_N$.

Control Unit of Embodiment

Figure 7:
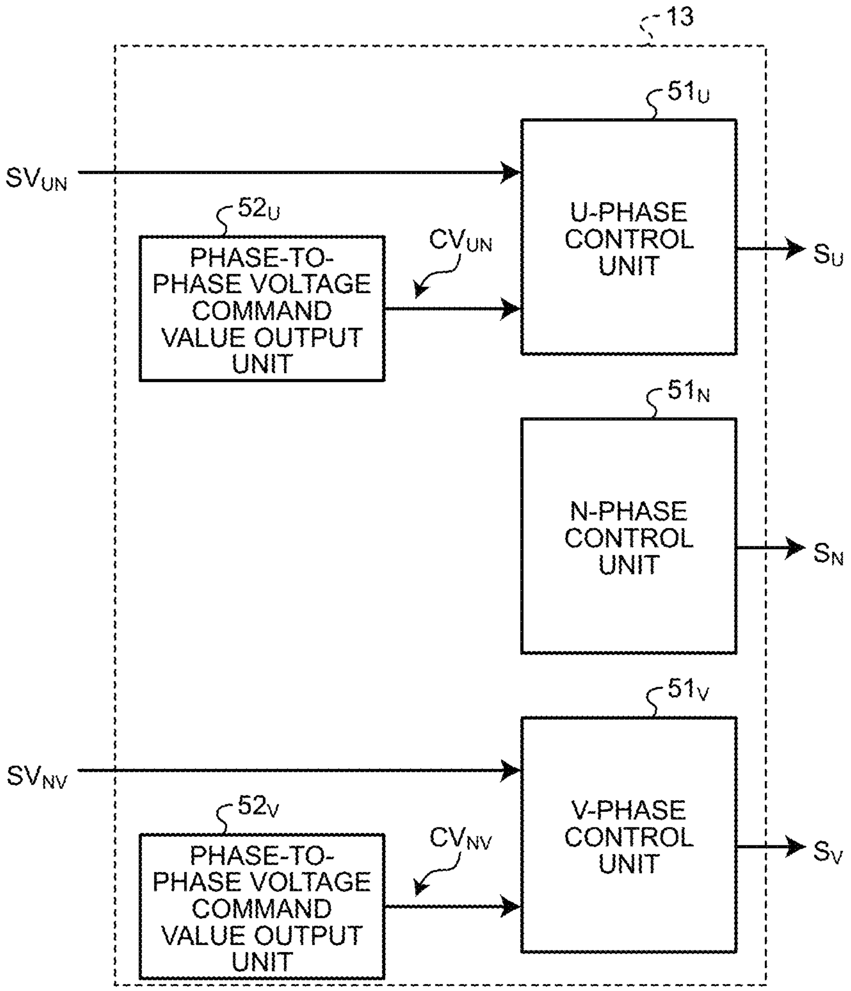
FIG. 7 is a diagram illustrating the overall configuration of a control unit of the single-phase three-wire inverter according to an embodiment.

FIG. 7 is a diagram illustrating the overall configuration of the control unit of the single-phase three-wire inverter according to an embodiment.

The control unit 13 includes a U-phase control unit $\mathbf{51}_U$, a V-phase control unit $\mathbf{51}_V$, an N-phase control unit $\mathbf{51}_N$, a phase-to-phase voltage command value output unit $\mathbf{52}_U$, and a phase-to-phase voltage command value output unit $\mathbf{52}_V$.

The U-phase control unit $\mathbf{51}_U$ corresponds to an example of a “first voltage control unit” according to the present disclosure. The V-phase control unit $\mathbf{51}_V$ corresponds to an example of a “second voltage control unit” according to the present disclosure. The N-phase control unit $\mathbf{51}_N$ corresponds to an example of a “third voltage control unit” according to the present disclosure.

The signal $SV_{UN}$ representing the U-phase to N-phase voltage $V_{UN}$ is input to the U-phase control unit $\mathbf{51}_U$ from the voltage detector 44.

The phase-to-phase voltage command value output unit $\mathbf{52}_U$ outputs a U-phase to N-phase voltage command value $CV_{UN}$ to the U-phase control unit $\mathbf{51}_U$. The phase-to-phase voltage command value output unit $\mathbf{52}_U$ is illustrated that outputs the U-phase to N-phase voltage command value $CV_{UN}$ on the basis of the U-phase current $I_U$, the DC input voltage Vin, and the like, but the present disclosure is not limited thereto.

The U-phase control unit $\mathbf{51}_U$ outputs the switching control signal $S_U$ to the U-phase arm $\mathbf{11}_U$, on the basis of the signal $SV_{UN}$ and the U-phase to N-phase voltage command value $CV_{UN}$. The U-phase control unit $\mathbf{51}_U$ outputs the switching control signal $S_U$ so that the U-phase to N-phase voltage $V_{UN}$ has the U-phase to N-phase voltage command value $CV_{UN}$.

The signal $SV_{NV}$ representing the N-phase to V-phase voltage $V_{NV}$ is input to the V-phase control unit $\mathbf{51}_V$ from the voltage detector 45.

The phase-to-phase voltage command value output unit $\mathbf{52}_V$ outputs an N-phase to V-phase voltage command value $CV_{NV}$ to the V-phase control unit $\mathbf{51}_V$. The phase-to-phase voltage command value output unit $\mathbf{52}_V$ is illustrated that outputs the N-phase to V-phase voltage command value $CV_{NV}$ on the basis of the V-phase current $I_V$, the DC input voltage Vin, and the like, but the present disclosure is not limited thereto.

The V-phase control unit 51$_V$ outputs the switching control signal $S_V$ to the V-phase arm 11$_V$ on the basis of the signal $SV_{NV}$ and the N-phase to V-phase voltage command value $CV_{NV}$. The V-phase control unit 51$_V$ outputs the switching control signal $S_V$ so that the N-phase to V-phase voltage $V_{NV}$ has the N-phase to V-phase voltage command value $VC_{NV}$.

In this manner, the U-phase control unit 51$_U$ and the V-phase control unit 51$_V$ output the switching control signal $S_U$ and the switching control signal $S_V$ respectively independently. This is to prevent, for example, the N-phase to V-phase voltage $V_{NV}$ from being affected, when the U-phase to N-phase voltage $V_{UN}$ is limited (limiter).

The N-phase control unit 51$_N$ Outputs the switching control signal $S_N$ to the N-phase arm 11$_N$ so that the N-phase potential is a midpoint potential.

This is because the N-phase potential affects both the U-phase to N-phase voltage $V_{UN}$ and the N-phase to V-phase voltage $V_{NV}$.

Figure 8:
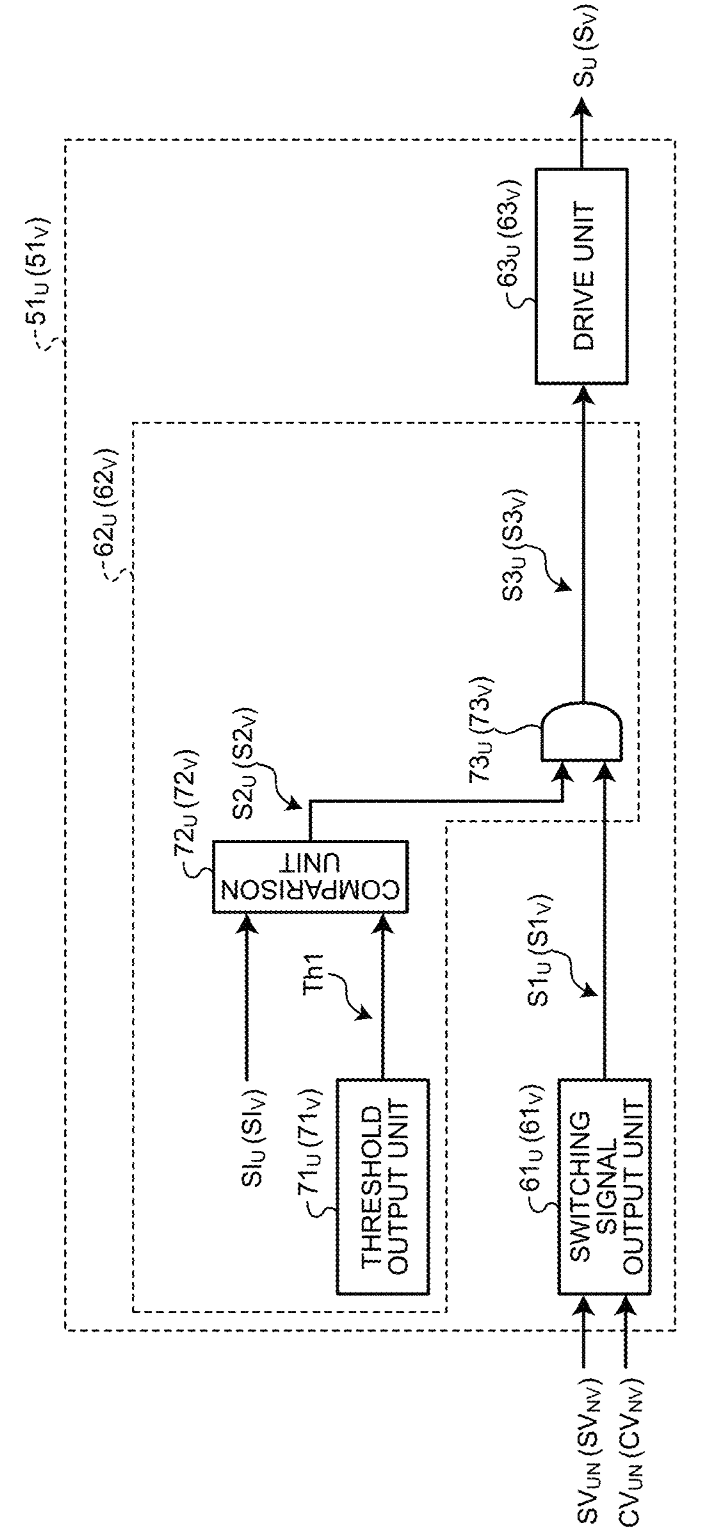
FIG. 8 is a diagram illustrating a configuration of each of a U-phase control unit and a V-phase control unit according to an embodiment.

FIG. 8 is a diagram illustrating a configuration of each of the U-phase control unit and the V-phase control unit according to an embodiment. In FIG. 8, the U-phase control unit 51$_U$ will be mainly described. The configuration of the V-phase control unit 51$_V$ is similar to the configuration of the U-phase control unit 51$_U$, and therefore, individual configurations thereof will not be described.

The U-phase control unit 51$_U$ includes a switching signal output unit 61$_U$, an overcurrent protection unit 62$_U$, and a drive unit 63$_U$. The overcurrent protection unit 62$_U$ includes a threshold output unit 71$_U$, a comparison unit 72$_U$, and an AND circuit 73$_U$.

The overcurrent protection unit 62$_U$ corresponds to an example of a "first protection circuit" according to the present disclosure. An overcurrent protection unit 62$_V$ corresponds to an example of a "second protection circuit" according to the present disclosure. The comparison unit 72$_U$ corresponds to an example of a "first comparator" according to the present disclosure. A comparison unit 72$_V$ corresponds to an example of a "second comparator" according to the present disclosure. The AND circuit 73$_U$ corresponds to an example of a "first AND circuit" according to the present disclosure. An AND circuit 73$_V$ corresponds to an example of a "second AND circuit" according to the present disclosure.

The switching signal output unit 61$_U$ outputs the pulse width modulation signal (PWM signal) $S1_U$ to one input terminal of the AND circuit 73$_U$. The switching signal output unit 61$_U$ performs, for example, proportional-integral-derivative (PID) operation on a deviation between the U-phase to N-phase voltage command value $CV_{UN}$ and the U-phase to N-phase voltage $V_{UN}$, and outputs the pulse width modulation signal $S1_U$ so that the U-phase to N-phase voltage $V_{UN}$ has the U-phase to N-phase voltage command value $CV_{UN}$.

The threshold output unit 71 outputs a phase current threshold Th1 to one input terminal of the comparison unit 72$_U$.

In the embodiment, the phase current threshold Th1 has the same value between the U-phase and the V-phase.

The phase current threshold Th1 corresponds to an example of a "first threshold" according to the present disclosure.

The signal $SI_U$ indicating the U-phase current $I_U$ is input to the other input terminal of the comparison unit 72$_U$. The comparison unit 72$_U$ compares the absolute value of the U-phase current $I_U$ with the phase current threshold Th1. When the absolute value of the U-phase current $I_U$ is less than the phase current threshold Th1, the comparison unit 72$_U$ outputs the high-level comparison result signal $S2_U$ to the other input terminal of the AND circuit 73$_U$. When the absolute value of the U-phase current $I_U$ is equal to or larger than the phase current threshold Th1, the comparison unit 72$_U$ outputs the low-level comparison result signal $S2_U$ to the other input terminal of the AND circuit 73$_U$.

The AND circuit 73$_U$ performs an AND operation on the pulse width modulation signal $S1_U$ and the comparison result signal $S2_U$, and outputs the AND result signal $S3_U$ to the drive unit 63$_U$.

The drive unit 63$_U$ converts the voltage level of the AND result signal $S3_U$ and outputs the switching control signal $S_U$ to the U-phase arm 11$_U$.

In other words, when the absolute value of the U-phase current $I_U$ is equal to or larger than the phase current threshold Th1, the U-phase control unit 51$_U$ reduces the on-duty (a duty cycle representing a ratio of turning on of the first transistor 21) of the switching control signal $S_U$.

Similarly, when the absolute value of the V-phase current $I_V$ is equal to or larger than the phase current threshold Th1, the V-phase control unit 51$_V$ reduces the on-duty (a duty cycle representing a ratio of turning on of the third transistor 23) of the switching control signal $S_V$.

Figure 9:
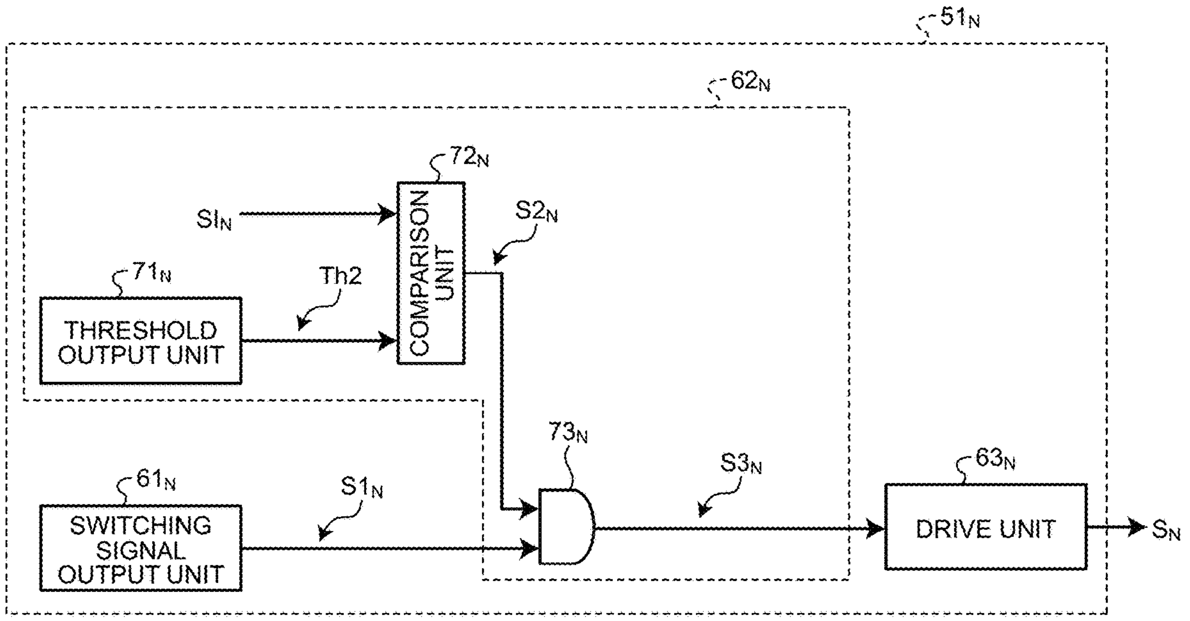
FIG. 9 is a diagram illustrating a configuration of an N-phase control unit according to an embodiment.

FIG. 9 is a diagram illustrating a configuration of the N-phase control unit according to an embodiment.

The N-phase control unit 51$_N$ includes a switching signal output unit 61$_N$, an overcurrent protection unit 62$_N$, and a drive unit 63$_N$. The overcurrent protection unit 62$_N$ includes a threshold output unit 71$_N$, a comparison unit 72$_N$, and an AND circuit 73$_N$.

The overcurrent protection unit 62$_N$ corresponds to an example of a "third protection circuit" according to the present disclosure. The comparison unit 72$_N$ corresponds to an example of a "third comparator" according to the present disclosure. The AND circuit 73$_N$ corresponds to an example of a "third AND circuit" according to the present disclosure.

The switching signal output unit 61$_N$ outputs a pulse width modulation signal (PWM signal) $S1_N$ to one input terminal of the AND circuit 73$_N$. The switching signal output unit 61$_N$ outputs the pulse width modulation signal $S1_N$ so that the N-phase potential is the midpoint potential.

The threshold output unit 71$_N$ outputs a phase current threshold Th2 to one input terminal of the comparison unit 72$_N$.

The phase current threshold Th2 corresponds to an example of a "second threshold" according to the present disclosure.

In the embodiment, the phase current threshold Th2 is larger than the phase current threshold Th1. In other words, the phase current threshold Th2>the phase current threshold Th1.

The reason why the phase current threshold Th2 is larger than the phase current threshold Th1 in the embodiment is as follows.

For example, it is assumed that the phase current thresholds for the U-phase, the V-phase, and the N-phase are the same (phase current threshold Th2=phase current threshold Th1). So, when the load 4 connected between the U-phase and the N-phase and the load 5 connected between the N-phase and the V-phase have opposite power factors, the overcurrent protection unit 62$_N$ for the N-phase operates for overcurrent protection earlier than the overcurrent protection unit 62$_U$ for the U-phase and the overcurrent protection unit $62_V$ for the V-phase, as compared with the same power factors of the load 4 and the load 5 (when the power factor of the load 4=the power factor of the load 5=1).

Due to the opposite power factors of the load 4 and the load 5, current flowing between the U-phase and the N-phase and current flowing between the N-phase and the V-phase are in opposite phase. This is because N-phase current is twice U-phase current (=twice V-phase current).

From the above, in order to output current to the load 4 and the load 5 regardless of a difference in power factor between the load 4 and the load 5, it is preferable to make the phase current threshold Th2 for the N-phase larger than the current thresholds Th1 for the U-phase and the V-phase, depending on current tolerances of the fifth transistor 25 and the sixth transistor 26 of the N-phase arm $11_N$.

Note that the phase current threshold Th2 is more preferably larger than the phase current threshold Th1 and smaller than the current tolerances of the fifth transistor 25 and the sixth transistor 26 of the N-phase arm $11_N$.

The description returns to the N-phase control unit $51_N$. The signal $SI_N$ representing the N-phase current $I_N$ is input to the other input terminal of the comparison unit $72_N$. The comparison unit $72_N$ compares the absolute value of the N-phase current $I_N$ with the phase current threshold Th2. When the absolute value of the N-phase current $I_N$ is less than the phase current threshold Th2, the comparison unit $72_N$ outputs a high-level comparison result signal $S2_N$ to the other input terminal of the AND circuit $73_N$. When the absolute value of the N-phase current $I_N$ is equal to or larger than the phase current threshold Th2, the comparison unit $72_N$ outputs a low-level comparison result signal $S2_N$ to the other input terminal of the AND circuit $73_N$.

The drive unit $63_N$ converts the voltage level of an AND result signal $S3_N$ and outputs the switching control signal $S_N$ to the N-phase arm $11_N$.

In other words, when the absolute value of the N-phase current $I_N$ is equal to or larger than the phase current threshold Th2, the N-phase control unit $51_N$ reduces the on-duty (a duty cycle representing a ratio of turning on of the fifth transistor 25) of the switching control signal $S_N$.

Circuit Simulation Results of Embodiment

Figure 10:
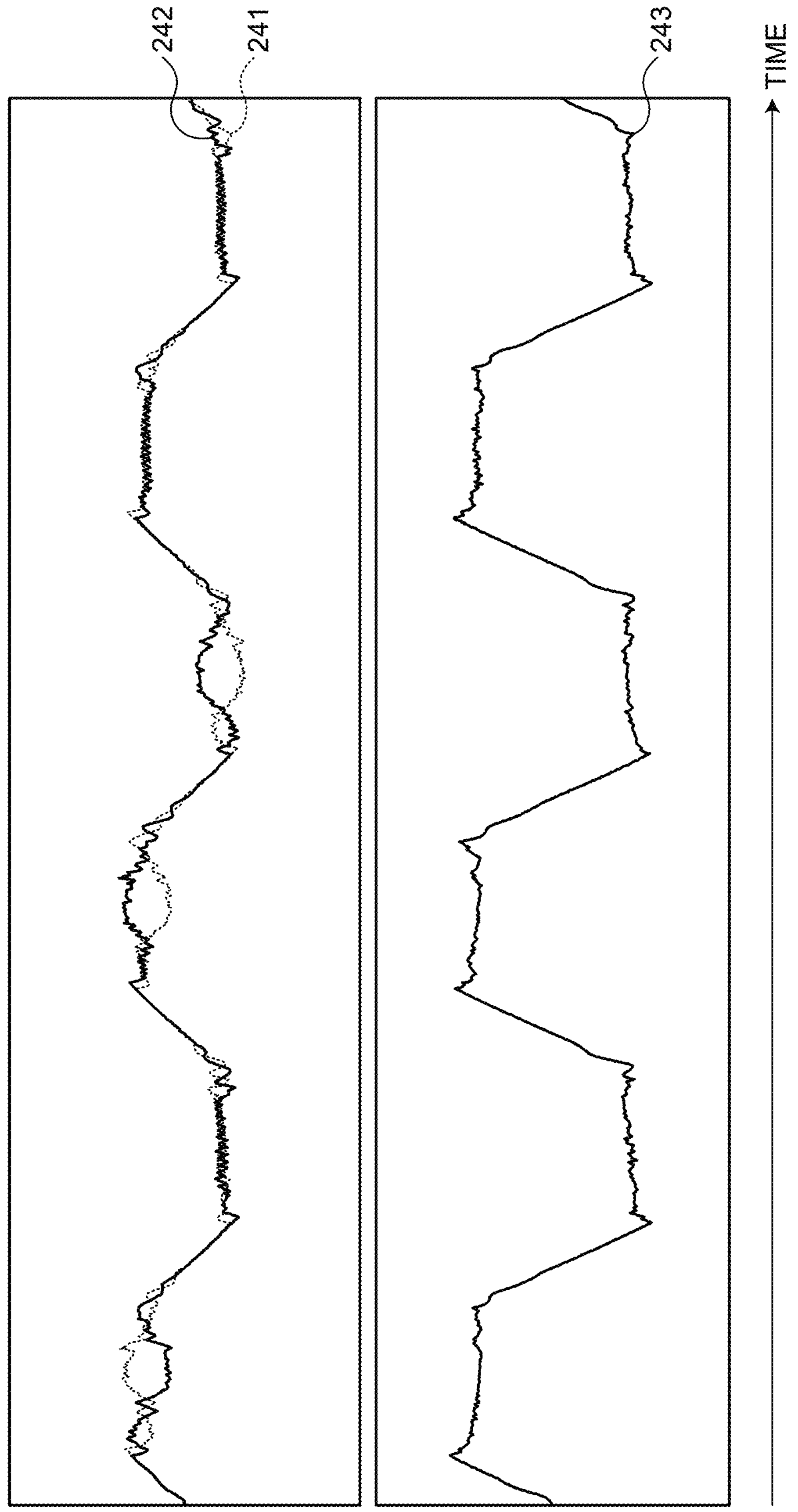
FIG. 10 is a graph illustrating circuit simulation results according to an embodiment.

FIG. 10 is a graph illustrating circuit simulation results according to an embodiment. Specifically, FIG. 10 is a graph illustrating the circuit simulation results of the single-phase three-wire inverter of the embodiment, with an overcurrent flowing through the load 6 between the U-phase and the V-phase.

In FIG. 10, a line 241 represents the U-phase to N-phase voltage $V_{UN}$, a line 242 represents the N-phase to V-phase voltage $V_{NV}$, and a line 243 represents the U-phase to V-phase voltage $V_{UV}$.

This example shows that due to the overcurrent through the load 6, the U-phase to V-phase voltage $V_{UV}$ (line 243) is limited as illustrated in FIG. 10. Furthermore, the U-phase to N-phase voltage $V_{UN}$ (line 241) and the N-phase to V-phase voltage $V_{NV}$ (line 242) are also limited.

Figure 11:
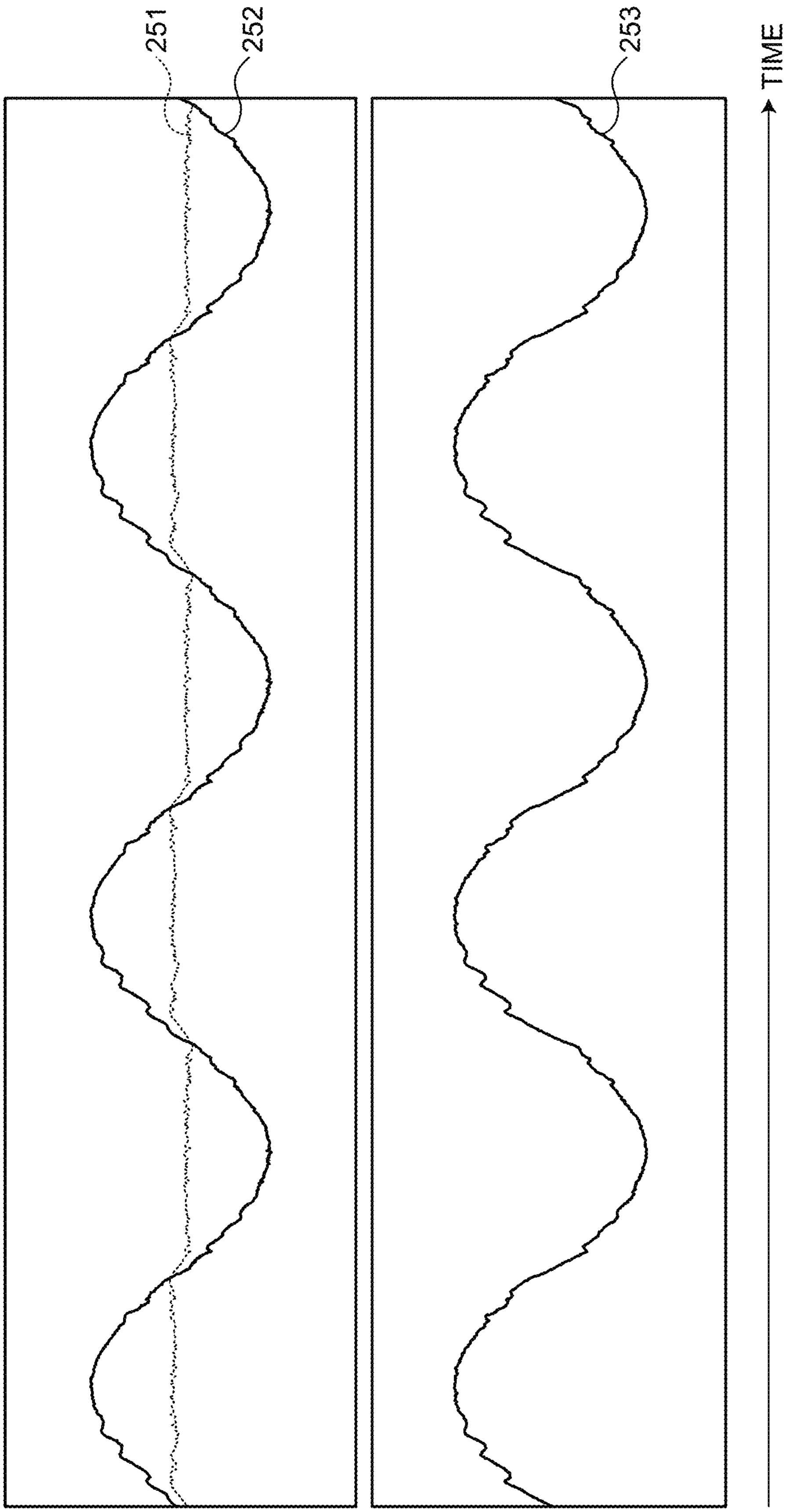
FIG. 11 is a graph illustrating circuit simulation results according to an embodiment.

FIG. 11 is a graph illustrating circuit simulation results according to an embodiment. Specifically, FIG. 11 is a graph illustrating the circuit simulation results of the single-phase three-wire inverter of the embodiment, with an overcurrent flowing through the load 4 between the U-phase and the N-phase.

In FIG. 11, a line 251 represents the U-phase to N-phase voltage $V_{UN}$, a line 252 represents the N-phase to V-phase voltage $V_{NV}$, and a line 253 represents the U-phase to V-phase voltage $V_{UV}$.

Effects of Embodiment

[1] The circuit simulation results (FIG. 11) with the overcurrent flowing through the load 4 of the embodiment is compared with the measurement results (FIG. 3) with the overcurrent flowing through the load 4 of the first comparative example.

The single-phase three-wire inverter 1 according to the embodiment is configured so that the N-phase to V-phase voltage $V_{NV}$ (line 251) and the U-phase to V-phase voltage $V_{UV}$ (line 253) do not reach high voltages, are not limited, and have sinusoidal waveforms without waveform disturbance.

[2] As compared with the second comparative example, the single-phase 3-wire inverter 1 of the embodiment is provided with the overcurrent protection unit $62_N$ also for the N-phase.

Therefore, the control unit 13 of the embodiment can suppress the overcurrent flowing through the N-phase arm $11_N$, and therefore, damage of the fifth transistor 25 and the sixth transistor 26 of the N-phase arm $11_N$ can be suppressed.

[3] In the single-phase three-wire inverter 1 according to the embodiment, the phase current threshold Th2 for the N-phase is larger than the current thresholds Th1 for the U-phase and the V-phase.

Therefore, the single-phase three-wire inverter 1 according to the embodiment is configured to output current to the load 4 and the load 5, even when the load 4 connected between the U-phase and the N-phase and the load 5 connected between the N-phase and the V-phase have different power factors.

According to the present disclosure, when the overcurrent load is connected between the first phase and the third phase, overvoltage between the third phase and the second phase can be suppressed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A single-phase three-wire inverter comprising:

a first arm that is connected between a first input terminal and a second input terminal to output first phase voltage and first phase current from a first connection point between a first switching element and a second switching element;

a second arm that is connected between the first input terminal and the second input terminal to output second phase voltage and second phase current from a second connection point between a third switching element and a fourth switching element;

a third arm that is connected between the first input terminal and the second input terminal to output third phase voltage and third phase current from a third connection point between a fifth switching element and a sixth switching element;

a filter that is provided between the first connection point and a first output terminal, between the second connection point and a second output terminal, and between the third connection point and a third output terminal; and a control unit that outputs a first switching signal, a second switching signal, and a third switching signal, to the first arm to the third arm, respectively, wherein the control unit reduces a duty cycle of the first switching signal when an absolute value of the first phase current is equal to or larger than a first threshold current, reduces a duty cycle of the second switching signal when an absolute value of the second phase current is equal to or larger than the first threshold current, and reduces a duty cycle of the third switching signal when an absolute value of the third phase current is equal to or larger than a second threshold current larger than the first threshold current.

2. The single-phase three-wire inverter according to claim 1, wherein the control unit includes:

a first voltage control unit that generates the first switching signal so that first phase to phase voltage between the first connection point and the third connection point has a first command voltage;

a second voltage control unit that generates the second switching signal so that second phase to phase voltage between the third connection point and the second connection point has a second command voltage; and a third voltage control unit that generates the third switching signal so that the third phase voltage is constant.

3. The single-phase three-wire inverter according to claim 2, wherein the first voltage control unit includes a first protection circuit that includes a first comparator to compare a detection value of the first phase current with a first threshold, and a first AND circuit to perform an AND operation on an output signal from the first comparator and the first switching signal, the second voltage control unit includes a second protection circuit that includes a second comparator to compare a detection value of the second phase current with the first threshold, and a second AND circuit to perform an AND operation on an output signal from the second comparator and the second switching signal, and the third voltage control unit includes a third protection circuit that includes a third comparator to compare a detection value of the third phase current with a second threshold larger than the first threshold, and a third AND circuit to perform an AND operation on an output signal from the third comparator and the third switching signal.

4. The single-phase three-wire inverter according to of claim 1, wherein the second threshold current is smaller than current tolerances of the fifth switching element and the sixth switching element.

5. A control method of controlling a single-phase three-wire inverter, the single-phase three-wire inverter including a first arm that is connected between a first input terminal and a second input terminal to output first phase voltage and first phase current from a first connection point between a first switching element and a second switching element, a second arm that is connected between the first input terminal and the second input terminal to output second phase voltage and second phase current from a second connection point between a third switching element and a fourth switching element, a third arm that is connected between the first input terminal and the second input terminal to output third phase voltage and third phase current from a third connection point between a fifth switching element and a sixth switching element, and a filter that is provided between the first connection point and a first output terminal, between the second connection point and a second output terminal, and between the third connection point and a third output terminal, the method comprising reducing a duty cycle of a first switching signal for the first arm when an absolute value of the first phase current is equal to or larger than a first threshold current, reducing a duty cycle of a second switching signal for the second arm when an absolute value of the second phase current is equal to or larger than the first threshold current, and reducing a duty cycle of a third switching signal for the third arm when an absolute value of the third phase current is equal to or larger than a second threshold current larger than the first threshold current.

* * * * *